(12) United States Patent  (10) Patent No.: US 7,696,869 B2
Brown  (45) Date of Patent: Apr. 13, 2010

(54) INTERACTIVE PROGRAMMABLE CONTAINER SECURITY AND COMPLIANCE SYSTEM

(75) Inventor: Stephen J. Brown, Woodside, CA (US)

(73) Assignee: Health Hero Network, Inc., Palo Alto, CA (US)

( * ) Notice: Subject to any disclaimer, the term of this patent is extended or adjusted under 35 U.S.C. 154(b) by 370 days.

(21) Appl. No.: 11/696,884

(22) Filed: Apr. 5, 2007

(65) Prior Publication Data

US 2008/0246598 A1   Oct. 9, 2008

(51) Int. Cl.
G08B 1/08 (2006.01)
(52) U.S. Cl. .................... 340/539.22; 340/539.31; 340/517
(58) Field of Classification Search ........... 340/572.1, 340/572.4, 568.1, 571, 517, 523, 539.26, 340/539.31, 539.22; 235/380, 381; 250/221, 250/222.1; 700/241, 244
See application file for complete search history.

(56) References Cited

U.S. PATENT DOCUMENTS

| | | |
|---|---|---|
| 3,961,323 A | 6/1976 | Hartkorn |
| 4,688,244 A | 8/1987 | Hannon et al. |
| 4,750,197 A | 6/1988 | Denekamp et al. |
| 4,816,822 A | 3/1989 | Vache et al. |
| 5,515,030 A | 5/1996 | Citron et al. |
| 5,594,740 A | 1/1997 | LaDue |
| 5,615,247 A | 3/1997 | Mills |
| 5,729,199 A | 3/1998 | Cooper et al. |
| 5,751,245 A | 5/1998 | Janky et al. |
| 5,761,206 A | 6/1998 | Kackman |
| 5,774,876 A | 6/1998 | Woolley et al. |
| 5,804,810 A | 9/1998 | Woolley et al. |
| 5,805,063 A | 9/1998 | Kackman |
| 5,808,541 A | 9/1998 | Golden |
| 5,826,195 A | 10/1998 | Westerlage et al. |
| 5,892,441 A | 4/1999 | Woolley et al. |
| 5,939,982 A | 8/1999 | Gagnon et al. |
| 5,969,595 A | 10/1999 | Schipper et al. |
| 6,057,779 A | 5/2000 | Bates |
| 6,087,952 A | 7/2000 | Prabhakaran |
| 6,104,301 A | 8/2000 | Golden |
| 6,148,196 A | 11/2000 | Baumann |
| 6,211,907 B1 | 4/2001 | Scaman et al. |
| 6,285,868 B1 | 9/2001 | LaDue |
| 6,289,457 B1 | 9/2001 | Bishop et al. |
| 6,295,449 B1 | 9/2001 | Westerlage et al. |
| 6,369,695 B1 | 4/2002 | Horon |
| 6,370,222 B1 | 4/2002 | Cornick, Jr. |
| 6,393,063 B1 | 5/2002 | Flood et al. |
| 6,408,330 B1 | 6/2002 | DeLaHuerga |

(Continued)

Primary Examiner—Van T. Trieu
(74) Attorney, Agent, or Firm—Rahman LLC (57) ABSTRACT

A monitoring system and method comprises a container adapted to house contents therein and a sensor device attached to the container, wherein the sensor device comprises at least one sensor that collects past and present data of the container, wherein the data comprises container content identification data, container geographic location data, container motion data, evidence of container tampering data, and biometric data of individuals handling the container; and a processor operatively connected to the at least one sensor and adapted to communicate the data to any of a user and a remote storage device. The processor is adapted to communicate the data into a language of choice of the user. The sensor device comprises an identification code, wherein the processor is adapted to regulate types of services the container is eligible to receive based on the identification code.

20 Claims, 4 Drawing Sheets

U.S. PATENT DOCUMENTS

| | | |
|---|---|---|
| 6,441,734 B1 | 8/2002 | Gutta et al. |
| 6,452,490 B1 | 9/2002 | Garland et al. |
| 6,463,419 B1 | 10/2002 | Kluss |
| 6,480,851 B1 | 11/2002 | Terek |
| 6,542,075 B2 | 4/2003 | Barker et al. |
| 6,556,138 B1 | 4/2003 | Sliva et al. |
| 6,583,713 B1 | 6/2003 | Bates |
| 6,587,790 B1 | 7/2003 | Arnold |
| 6,624,760 B1 | 9/2003 | Kinzel et al. |
| 6,687,609 B2 | 2/2004 | Hsiao et al. |
| 6,701,438 B1 | 3/2004 | Prabandham et al. |
| 6,741,927 B2 | 5/2004 | Jones |
| 6,747,558 B1 | 6/2004 | Thorne et al. |
| 6,774,762 B2 | 8/2004 | Bates |
| 6,779,024 B2 | 8/2004 | DeLaHuerga |
| 6,792,323 B2 | 9/2004 | Krzyzanowski et al. |
| 6,801,130 B2 | 10/2004 | Campero |
| 6,816,090 B2 | 11/2004 | Teckchandani et al. |
| 6,826,514 B1 | 11/2004 | Antico et al. |
| 6,844,816 B1 | 1/2005 | Melton et al. |
| 6,847,892 B2 | 1/2005 | Zhou et al. |
| 6,847,906 B2 | 1/2005 | Ozawa |
| 6,870,476 B2 | 3/2005 | Cockburn et al. |
| 6,876,756 B1 | 4/2005 | Vieweg |
| 6,879,257 B2 | 4/2005 | Hisano et al. |
| 6,879,962 B1 | 4/2005 | Smith et al. |
| 6,883,709 B2 | 4/2005 | Joseph |
| 6,883,710 B2 | 4/2005 | Chung |
| 6,891,470 B2 | 5/2005 | Bohinc, Jr. |
| 6,902,108 B1 | 6/2005 | Chapman |
| 6,915,954 B2 | 7/2005 | Knowles et al. |
| 6,917,853 B2 * | 7/2005 | Chirnomas .................. 700/244 |
| 6,917,902 B2 | 7/2005 | Alexander |
| 6,919,803 B2 | 7/2005 | Breed |
| 6,927,688 B2 | 8/2005 | Tice |
| 6,937,164 B2 | 8/2005 | Thomson et al. |
| 6,956,314 B2 | 10/2005 | Higashino et al. |
| 6,961,000 B2 | 11/2005 | Chung |
| 6,965,314 B2 | 11/2005 | Bohine, Jr. |
| 6,972,677 B2 | 12/2005 | Coulthard |
| 6,972,682 B2 | 12/2005 | Lareau et al. |
| 6,973,385 B2 | 12/2005 | Ulrich |
| 6,975,224 B2 | 12/2005 | Galley, III et al. |
| 6,982,643 B2 | 1/2006 | Garfinkle |
| 6,995,669 B2 | 2/2006 | Morales |
| 7,002,472 B2 | 2/2006 | Stratmoen et al. |
| 7,005,961 B2 | 2/2006 | Bates |
| 7,009,510 B1 | 3/2006 | Douglass et al. |
| 7,009,517 B2 | 3/2006 | Wood |
| 7,012,520 B2 | 3/2006 | Webb, Sr. |
| 7,012,529 B2 | 3/2006 | Sajkowsky |
| 7,015,814 B2 | 3/2006 | Ireland et al. |
| 7,019,640 B2 | 3/2006 | Canich et al. |
| 7,019,644 B2 | 3/2006 | Barrie |
| 7,019,683 B2 | 3/2006 | Stevens et al. |
| 7,027,416 B1 | 4/2006 | Kriz |
| 7,027,621 B1 | 4/2006 | Prokoski |
| 7,027,808 B2 | 4/2006 | Wesby |
| 7,030,755 B2 | 4/2006 | Bohinc, Jr. |
| 7,036,729 B2 | 5/2006 | Chung |
| 7,038,585 B2 | 5/2006 | Hall et al. |
| 7,046,138 B2 | 5/2006 | Webb, Sr. |
| 7,091,857 B2 | 8/2006 | Lanigan et al. |
| 7,098,784 B2 | 8/2006 | Easley et al. |
| 7,098,793 B2 | 8/2006 | Chung |
| 7,100,424 B2 | 9/2006 | Wilson |
| 7,102,493 B1 | 9/2006 | Coppinger et al. |
| 7,106,244 B2 | 9/2006 | Hsu |
| 7,164,117 B2 * | 1/2007 | Breed et al. .................. 250/221 |
| 7,389,916 B2 * | 6/2008 | Chirnomas .................. 235/381 |
| 2003/0134457 A1 | 7/2003 | Kim et al. |
| 2004/0056761 A1 | 3/2004 | Vaseloff et al. |
| 2004/0239435 A1 | 12/2004 | Hughes et al. |
| 2005/0046567 A1 | 3/2005 | Mortenson et al. |
| 2005/0151643 A1 | 7/2005 | Rajapakse et al. |
| 2005/0197844 A1 | 9/2005 | Ng et al. |
| 2005/0253708 A1 | 11/2005 | Bohman et al. |
| 2005/0258238 A1 * | 11/2005 | Chapman .................. 235/380 |
| 2006/0181413 A1 | 8/2006 | Mostov |
| 2006/0202824 A1 | 9/2006 | Carroll et al. |
| 2007/0008410 A1 * | 1/2007 | Benson et al. .............. 348/143 |

\* cited by examiner

INTERACTIVE PROGRAMMABLE CONTAINER SECURITY AND COMPLIANCE SYSTEM

BACKGROUND

1. Technical Field

The embodiments herein generally relate to security and compliance systems, and, more specifically, to a cargo container security and compliance system.

2. Description of the Related Art

Containerized shipping is the most common method of freight shipment in today's economy. Since approximately 90% of all goods shipped internationally are moved in containers, container transport has become the backbone of the world's economy. Every year 200 million cargo containers move between major seaports. Accordingly, the global economy depends on smooth and consistent container transport.

Most global freight is shipped in standardized containers so that cargo can be transported through a network of vessels, ports, trucks, and trains without regard to the container contents. These containers form a critical infrastructure for trade in the global economy. Containers move through a vast network of service providers in thousands of ports and transportation hubs without adequate monitoring and inspection, posing an ongoing and unresolved security risk.

Port operators, shippers, suppliers, customers, security, regulatory, and government agencies generally lack adequate systems to accurately and systematically monitor and inspect containers for security risks, infestation, contraband, and quality assurance. In addition, generally no reliable means currently exists to continuously monitor and screen the port workers and inspectors who interact with containers in transit.

The security and tracking of freight shipments have become an important issue for governments, security agencies, ports, insurance companies, shippers, and transportation companies. It has long been desired to provide a reliable, inexpensive security monitoring and compliance system for shipping containers, especially those used in international shipping.

A wide variety of systems have been developed for detecting, analyzing, and monitoring the contents of freight containers and the like. Many sensing technologies such as passive infrared sensors and ultrasonic motion sensors have also been employed in the past. Efforts are underway by governments and industry to set standards for electronic monitoring of container seals so that tampering between the point of sealing the container and the point of opening the container can be detected and monitored. Other sensors are being developed to detect bombs and radioactive and other hazardous material.

While the conventional solutions are advantageous for their intended purposes, the existing state of the art generally does not systematically educate and monitor the observations of the individuals involved in container transport. The problem is even more complex because of the global nature of trade with different standards, different communication networks, and different languages of the operators and handlers. As mentioned, container shipping is a global business and containers are touched by many workers in many countries. The existing state of the art generally does not adequately provide a system that can adapt to local languages and local information based on end user identity or location.

Hence, there is a need to develop a security and compliance system for a large number of containers. There is a further need to develop a system to monitor people involved with the handling of the containers, and a system that can adapt to local needs or new information or security threats.

SUMMARY

In view of the foregoing, the embodiments herein provide a container security system and method for monitoring and performing quality assurance of a large number of containers by a plurality of stakeholders. The system includes sensors, a survey and sensor interface device, a server and database system comprising databases and an application server and remote service access device. Sensors are used to collect objective parameters for identification, location, motion, tampering, and other parameters. The survey and sensor interface device can be remotely programmed by a remote service center to survey an inspector for subjective information. Users of the survey and sensor interface device record their identity before answering remotely programmed survey questions regarding observations, activities, and other parameters. Security agencies and others can subscribe to services that enable accurate monitoring, reporting, tracking, and risk analysis of containers and recording of an inspection trail. Remote programming from the server enables the device to constantly survey inspectors based on the latest threat information.

Each device is uniquely identified and associated with a shipper and destination, which can be verified and tracked by targeted container polling through the device and network. By broadcasting programming data to the device either selectively or en-masse, container security protocols can be updated based on the latest threat information, and the individuals in the supply chain who interact with containers can be continuously monitored and screened. Interactive survey content transmitted to the device can be adapted to the local language of the end user based on location, identity and other profile information, while the data can be aggregated independent of the input language.

The embodiments herein provide an interactive programmable container security and compliance system and method combined with network-based services for monitoring and quality assurance of a large number of containers by a plurality of stakeholders. Moreover, the embodiments herein provide an interactive programmable container security and compliance system that collects data and information related to individuals involved in the supply chain, and records the identity and location of each user.

Furthermore, the embodiments herein provide an interactive programmable container security and compliance system that includes a wireless reporting system. Additionally, the embodiments herein provide an interactive programmable container security system to monitor multiple parameters from a plurality of sensors. Also, the embodiments herein provide an interactive programmable container security system where information or data can be communicated from the container to the information network and from the network to the container at any point of time.

The embodiments herein additionally provide a system adapted to analyze, stratify risk, and present reports based on multiple parameters. Still additionally, the embodiments herein provide a system adapted to reprogram security devices automatically via digital data broadcast. Moreover, the embodiments herein provide an interactive programmable container security and compliance system that overcomes the disadvantages of the prior art.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need to develop a security and compliance system for a large number of containers, and to develop a system to monitor people involved with the handling of the containers, and a system that can adapt to local needs or new information or security threats. The embodiments herein address these needs by providing an interactive programmable security device. The device has a memory and a microprocessor that is operatively connected to a transceiver. The memory stores the data/information modules that are used for security and monitoring purposes. A server is connected to the security device through a wireless communication system and is provided with a database to store digital data modules and information modules that are transmitted from the security device or input by a user or downloaded from a service provider. The security device has an external sensor port which is coupled with multiple sensors. The security device senses a variety of safety parameters to communicate with the user or service provider automatically. The transceiver receives a query sent by the server to a device or group of devices via digital broadcast. Referring now to the drawings and more particularly to FIGS. 1 through 4 where similar reference characters denote corresponding features consistently throughout the figures, there are shown preferred embodiments.

Figure 1:
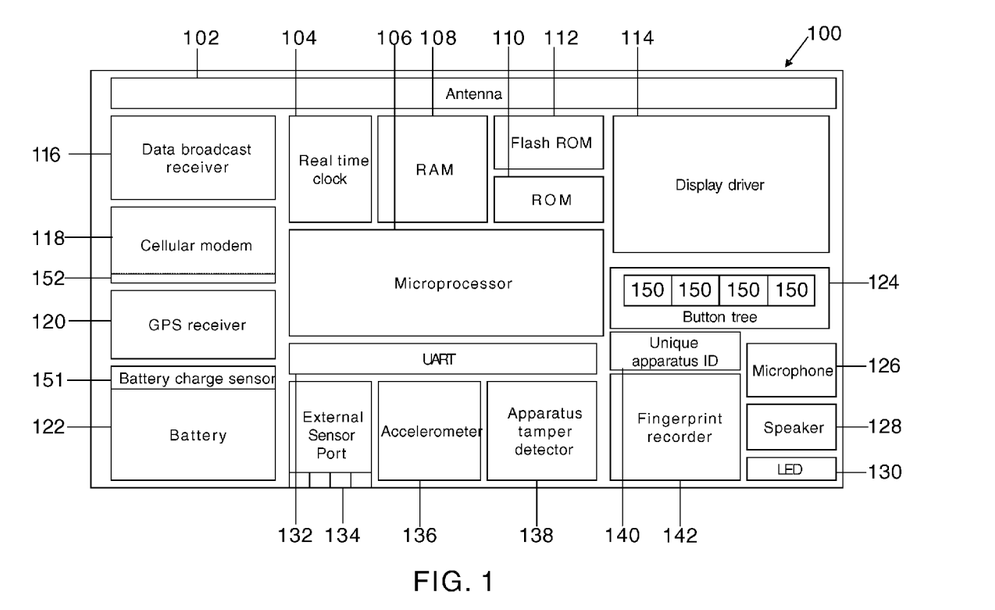
FIG. 1 illustrates a block diagram of a survey and sensor interface device according to an embodiment herein.

FIG. 1 illustrates a block diagram of an embedded survey and sensor device 100 according to an embodiment herein. The sensor device 100 is attached to a cargo container (302 shown in FIG. 4). The device 100 has a microprocessor 106 operatively connected to memory units such as random access memory (RAM) 108, read only memory (ROM) 110, and Flash ROM 112. The memory units store the digital data modules and the scripts received from a server 202 (shown in FIGS. 3 and 4) through digital data broadcast receiver 116 and/or cellular modem 118. A user may manually input data and activate the device 100 through the buttons 150 provided in a button tree 124. User interaction with the device 100 can also occur audibly through the use of the microphone 126, which is adapted to receive audio signals and a speaker 128, which is adapted to transmit audio signals.

The functional components in the device 100 are supplied with electrical power provided from a battery 122. A battery charge sensor 151 coupled to the battery 122 detects the residual charge in the battery 122 and the detected residual battery charge condition is indicated with a light-emitting diode (LED) 130. A liquid crystal display (not shown) is controlled by a display driver 114 to display text messages and queries stored in the device memory units. Real-time clock 104 records the date/time stamp of each user input session.

The cellular modem 118 has a wireless adapter 152 that connects the device 100 to a cellular mobile system 304 (of FIG. 4) for data transfer. Cellular modem 118 transmits query responses along with coordinates, location, tamper and motion history, and user biometric information. The survey and sensor device 100 also has an external sensor port 134 through which multiple external sensors (further shown in FIG. 2) are coupled to the system.

Again with respect to the device 100 of FIG. 1, global positioning satellite (GPS) receiver 120 is a location sensor that detects location coordinates by interpreting signals broadcast from global positioning satellites (not shown) and received by the device 100 through antenna 102. Data broadcast receiver 116 receives application content from a data broadcast stream. Furthermore, data broadcast receiver 116 receives encoded data broadcast to device 100 by satellite data transmission through antenna 102 and stores data that is encoded for a specific device or device group. A universal asynchronous receiver/transmitter (UART) 132 is included to facilitate the reception and transmission of data in the device 100 between various sensors and other data inputs (for example, external sensor port 134, accelerometer 136, apparatus tamper detector 138, fingerprint recorder 120) and the microprocessor 106.

The device 100 also has an apparatus tamper detector 138 which records whether the device 100 has been opened or removed from its position affixed to a container (302 shown in FIG. 4); for example, through the breaking of a seal (not shown) on the container 302 which forms a circuit.

The survey and sensor device 100 (of FIG. 1) includes an accelerometer 136 which acts as a movement sensor and records the relative motion of the device 100 and is preferably embodied as a three-dimensional accelerometer. The survey and sensor device 100 has fingerprint recorder 142 which acts as identification sensor and records biometric information of the user, preferably through a fingerprint capture unit and a voice print unit. The survey and sensor device 100 receives the input fingerprint data or input voice data of an individual such as a port worker or inspector who interacts with the container (302 shown in FIG. 4) in transit or other user of the device 100. The received fingerprint data or voice is compared with the stored fingerprint data or voice standard to identify a user.

The device 100 further includes a unique apparatus/device identification code 140. The identification code 140 indicates which content or which types of content the device 100 is eligible to receive from the data broadcast stream based on which services the device 100 is subscribed to or associated with, for example membership of a group of containers from a specific company or port. The security agencies and other subscribers such as a manufacturer, shipper, customer/shipping recipient, port operator, service provider/security agency, and government official, may subscribe to services that enable accurate monitoring, reporting, tracking and risk analysis of the container (302 shown in FIG. 4) and recording of any inspection trail. The memory units of the device 100 are adapted to store survey content that is intended for that specific device 100 based on its unique identification code 140 and its services identifier.

Figure 2:
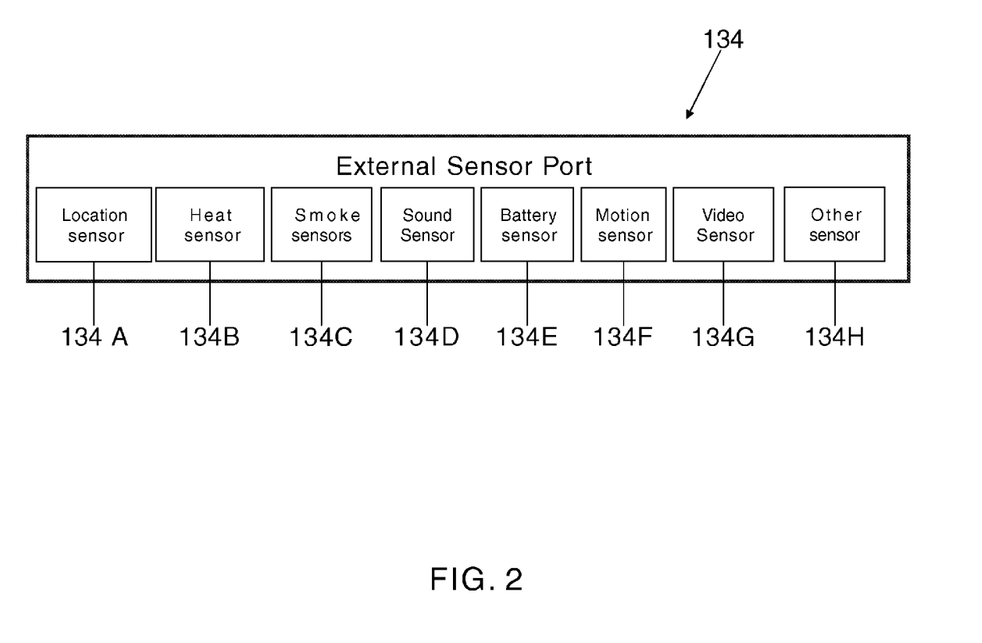
FIG. 2 illustrates different types of sensors that can be embedded in or connected to an external sensor port of the device of FIG. 1 for sensing various safety parameters according to an embodiment herein.

FIG. 2 illustrates various types of sensors 134A-134H that can be coupled to external sensor port 134 (of FIG. 1). For example, external sensor port 134 may comprise location sensor 134A, heat sensor 134B, smoke sensor 134C, sound sensor 134D, battery sensor 134E, motion sensor 134F, video sensor 134G, and other sensor 134H, which are included based on user-specified requirements. The device 100 (of FIG. 1) is modular in that multiple configurations can be enabled with different sensors used for different types of cargo or locations.

The location sensor 134A and/or an embedded GPS receiver 120 records the latitude and longitude of the current location of a container (302 shown in FIG. 4) mounted with a sensor and survey device 100 (of FIG. 1), preferably by receiving the GPS data. The heat sensor 134B (of FIG. 2) detects an overheated condition of a cargo container (302 shown in FIG. 4) or thermal level inside the cargo container 302. The smoke sensor 134C (of FIG. 2) detects the presence of smoke or a fire condition in a cargo container (302 shown in FIG. 4). The sound sensor 134D (of FIG. 2) measures the sound level inside the cargo container (302 shown in FIG. 4) to detect an abnormal sound condition inside the cargo container 302. The battery sensor 134E (of FIG. 2) measures the residual battery condition of a battery provided in a sensor and survey device to indicate a low battery level or an abnormal battery condition. The motion sensor 134F records the relative motion of the apparatus preferably through a three-dimensional piezoelectric accelerometer. The video sensor 134G receives a video image input from a video camera mounted inside a cargo container (302 shown in FIG. 4) or from an external device to identify an abnormal condition inside a cargo container 302. The other sensor 134H of FIG. 2 includes a tamper sensor which records whether the device 100 (of FIG. 1) has been opened or removed from its position affixed to a container (302 shown in FIG. 4), by preferably detecting the breaking of a seal which forms a circuit.

Figure 3:
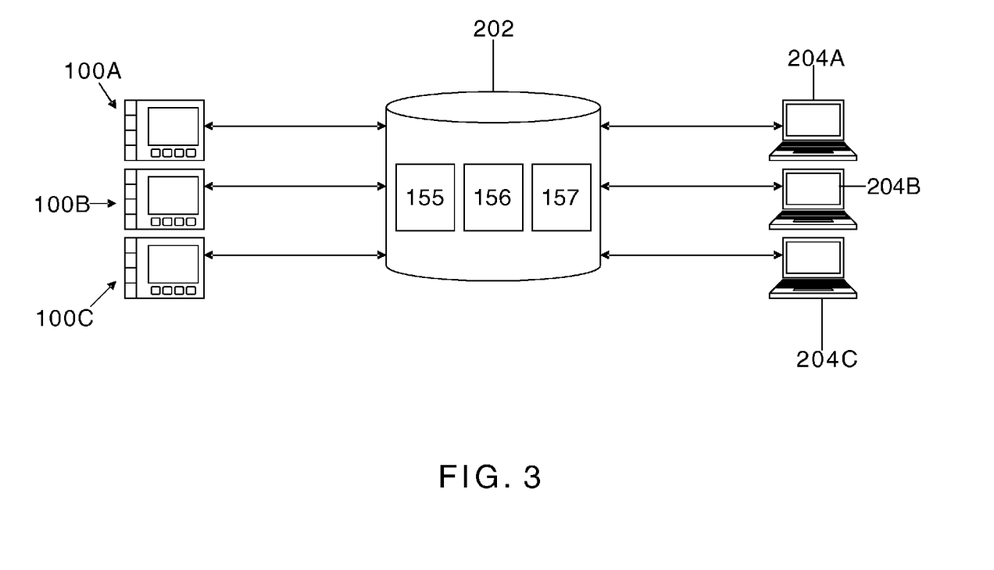
FIG. 3 illustrates a block diagram of a system for remote programming and exchange of scripts in a sensor and survey interface device connected to a remote service access device through a server and database system according to an embodiment herein.

FIG. 3 shows multiple sensor and survey interface devices 100A, 100B, 100C that are operatively connected to multiple remote service access devices 204A, 204B, 204C through a central server and database system 202. The collected data, information, and scripts are stored in one or more databases 155 and/or 156 at the remote server 202. More information on the database and storage of scripted content on the server can be found in U.S. Pat. No. 6,968,375, the complete contents of which, in its entirety, is herein incorporated by reference. The server and database system 202 preferably includes a database 155 for storing data collected by the survey devices 100A, 100B, 100C and sensors, a reference database or databases 156 for storing survey content, and an application server 157 with service applications that enable remote access to the collected data and reference database respectively to analyze and report information and to communicate new survey content and feedback to the survey devices 100A, 100B, 100C. The remote service access devices 204A, 204B, 204C comprise a computer capable of accessing applications, reports, and data from the server 202 over a wide area network preferably using an internet web browser.

Figure 4:
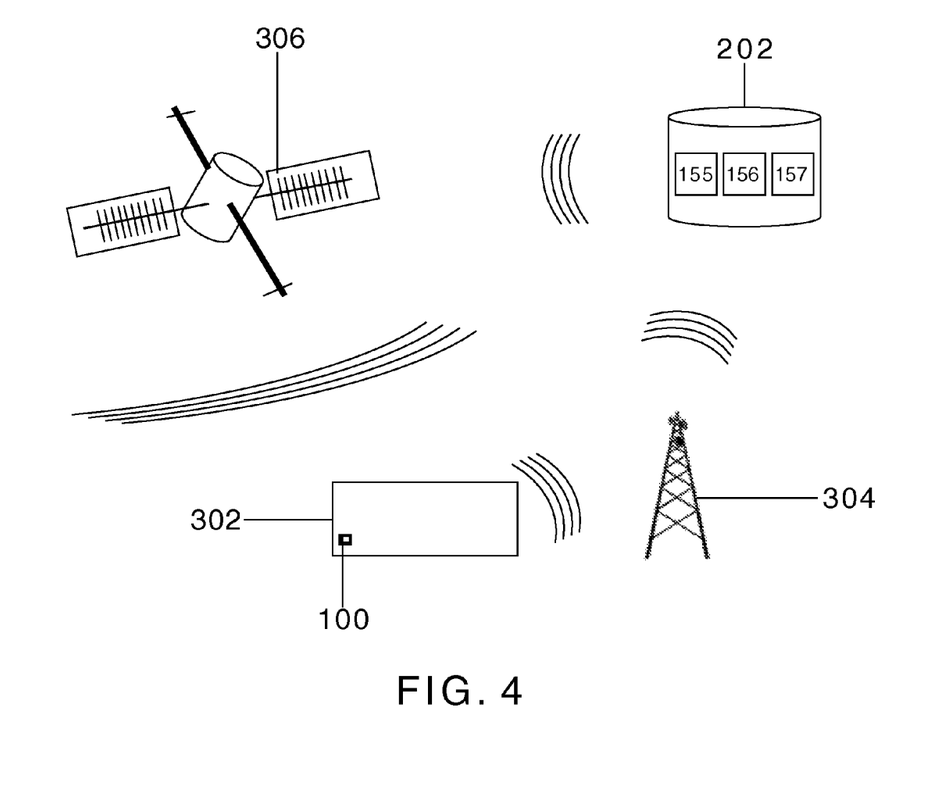
FIG. 4 illustrates an interactive programmable container security and compliance system, network, and mechanism for monitoring and performing quality assurance according to an embodiment herein.

FIG. 4 shows the interactive programmable container security and compliance system, network, and mechanism for monitoring and performing quality assurance. Container 302 is coupled with survey and sensor interface device 100 (of FIG. 1). Survey and sensor interface device 100 is operatively connected to server 202 through a cellular network system 304 for data and information transfer from a user to a service provider. Server 202 is operatively connected to digital broadcast satellite 306 to receive new content and program instructions that are transmitted in encrypted form and received by the device 100 depending on a match between the device identification and profile and the header information in the packet of data from the broadcast stream.

Messages are transmitted over the network between server 202 and device 100 with a combination of coding for the intended recipient and data. Each message portion indicates the unique intended recipient or group of recipients and indicates subscriber service type. The message portion includes survey content and other commands and instructions to organize the survey into a script. More information on remote programming of the device with scripted program instructions can be found in U.S. Pat. No. 6,968,375, the complete contents of which, in its entirety, is herein incorporated by reference. The collected survey data with respect to the request received from a user through the server 202 is sent back to the server 202 in a coded message that includes information about the sender along with collected data. The message sent back to the server 202 includes a unique identification code related to a survey and sensor interface device 100, a subscriber service information, and collected data.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A monitoring system comprising:
   a container that houses contents therein; and
   a sensor device attached to said container, wherein said sensor device comprises:
      at least one sensor that collects past and present data of said container, wherein the data comprises container content identification data, container geographic location data, container motion data, evidence of container tampering data, and biometric data of individuals handling said container;

a processor operatively connected to said at least one sensor, wherein said processor communicates said data to a user;
a universal asynchronous receiver/transmitter that receives and transmits data in said sensor device and between:
  various said at least one sensor;
  at least one data input comprising an external sensor port, an accelerometer, a tamper detector, a fingerprint recorder; and
  said processor;
a display driver operatively connected to said processor;
a liquid crystal display controlled by said display driver; and
a real-time clock that records a date/time stamp of a user input to said sensor device.

2. The system of claim 1, wherein said sensor device comprises a communications device, and wherein said system further comprises:
  a database system; and
  a communications channel,
  wherein said communications device transmits said data to said database system through said communications channel.

3. The system of claim 2, wherein said sensor device comprises a receiver, and wherein said system further comprises a transmitter that transmits past data from said database system, wherein said receiver receives said past data from said transmitter.

4. The system of claim 2, further comprising at least one service access device operatively connected to said database system, wherein said at least one service access device generates computer executable applications and reports based on data processed by said sensor device and transmitted to said database system.

5. The system of claim 1, wherein the communications from said processor comprise any of audio communications and visual communications.

6. The system of claim 1, wherein said processor communicates said data into a language of choice of said user.

7. The system of claim 1, wherein said sensor device comprises an identification code, wherein said processor regulates types of services said container is eligible to receive based on said identification code.

8. The system of claim 1, wherein said at least one sensor comprises any of a location sensor, a heat sensor, a smoke sensor, a sound sensor, a battery sensor, a motion sensor, a video sensor, a user identification sensor, and a three-dimensional accelerometer.

9. The system of claim 1, wherein said sensor device comprises a user interface that receives instructions from said user and transmits the communications from said processor to said user.

10. A monitoring system comprising:
  a remote data storage device;
  a container that houses contents therein;
  a sensor device attached to said container, wherein said sensor device comprises:
    at least one sensor that collects past and present data of said container, wherein the data comprises container content identification data, container geographic location data, container motion data, evidence of container tampering data, and biometric data of individuals handling said container;
    a processor operatively connected to said at least one sensor, wherein said processor transmits said data to said remote data storage device;
    a universal asynchronous receiver/transmitter that receives and transmits data in said sensor device and between:
      various said at least one sensor;
      at least one data input comprising an external sensor port, an accelerometer, a tamper detector, a fingerprint recorder; and
      said processor;
    a display driver operatively connected to said processor;
    a liquid crystal display controlled by said display driver; and
    a real-time clock that records a date/time stamp of a user input to said sensor device.

11. The system of claim 10, wherein said sensor device comprises a communications device, wherein said remote data storage device comprises a database system, and wherein said system further comprises a communications channel, wherein said communications device transmits said data to said database system through said communications channel.

12. The system of claim 11, wherein said sensor device comprises a receiver, and wherein said system further comprises a transmitter that transmits past data from said database system, wherein said receiver receives said past data from said transmitter.

13. The system of claim 11, further comprising at least one service access device operatively connected to said database system, wherein said at least one service access device generates computer executable applications and reports based on data processed by said sensor device and transmitted to said database system.

14. The system of claim 10, wherein the communications from said processor comprise any of audio communications and visual communications.

15. The system of claim 10, wherein said processor communicates said data into any one of a plurality of languages.

16. The system of claim 10, wherein said sensor device comprises an identification code, wherein said processor regulates types of services said container is eligible to receive based on said identification code.

17. The system of claim 10, wherein said at least one sensor comprises any of a location sensor, a heat sensor, a smoke sensor, a sound sensor, a battery sensor, a motion sensor, a video sensor, a user identification sensor, and a three-dimensional accelerometer.

18. The system of claim 10, wherein said sensor device comprises an interface that receives instructions from said remote storage device and transmits the communications from said processor to said remote storage device.

19. A method of monitoring a container, said method comprising:
  collecting past and present data of a container using a sensor device attached to said container, wherein said container houses contents therein, and wherein the data comprises container content identification data, container geographic location data, container motion data, evidence of container tampering data, and biometric data of individuals handling said container, wherein said sensor device sensor device comprises:
    at least one sensor that collects said past and present data of said container, wherein the data comprises container content identification data, container geographic location data, container motion data, evidence of container tampering data, and biometric data of individuals handling said container;
    a processor operatively connected to said at least one sensor;

a universal asynchronous receiver/transmitter that receives and transmits data in said sensor device and between:
  various said at least one sensor;
  at least one data input comprising an external sensor port, an accelerometer, a tamper detector, a fingerprint recorder; and
  said processor;
a display driver operatively connected to said processor;
a liquid crystal display controlled by said display driver; and
a real-time clock that records a date/time stamp of a user input to said sensor device;

communicating said data to any of a remote storage device and a user; and receiving and transmitting said data between said at least one sensor and said remote storage device.

20. The method of claim 19, wherein said data indicates:

a description of said contents in said container;

a description of all geographic locations where said container has been transported;

a description of mechanical movements of said container; and a description of whether said container has been opened and if said container has been opened whether such opening is authorized by a predetermined code.

* * * * *